(12) United States Patent
Malhan et al.

(10) Patent No.: US 9,046,431 B2
(45) Date of Patent: Jun. 2, 2015

(54) SINGLE EAR STATOR ANTENNA FOR WIRELESS TORQUE MEASUREMENT SYSTEM

(71) Applicant: HONEYWELL INTERNATIONAL INC., Morristown, NJ (US)

(72) Inventors: Vishal Malhan, Karnataka (IN); Vijay Tippanna Talikoti, Karnataka (IN); Gautham Ramamurthy, Karnataka (IN); Veeresh Shivaprakash Yagati, Karnataka (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 92 days.

(21) Appl. No.: 13/899,131

(22) Filed: May 21, 2013

(65) Prior Publication Data

US 2014/0000386 A1   Jan. 2, 2014

Related U.S. Application Data

(60) Provisional application No. 61/665,815, filed on Jun. 28, 2012.

(51) Int. Cl.
  *G01L 1/22*   (2006.01)
  *G01L 3/10*   (2006.01)
(52) U.S. Cl.
  CPC ..................................... *G01L 3/108* (2013.01)
(58) Field of Classification Search
  CPC ......................................................... G01L 3/108

USPC ............................................. 73/862.331–338
See application file for complete search history.

(56) References Cited

U.S. PATENT DOCUMENTS

| 4,131,839 | A  * | 12/1978 | Springer ....................... 318/675 |
| 6,876,311 | B2 * | 4/2005 | Sommerfeld et al. ... 340/870.07 |
| 8,186,948 | B2 * | 5/2012 | Kabatzke et al. ................. 416/1 |
| 2009/0033180 | A1* | 2/2009 | Abe ........................... 310/68 B |
| 2010/0124498 | A1* | 5/2010 | Kabatzke et al. ............... 416/61 |
| 2010/0126299 | A1* | 5/2010 | Baldassari et al. .............. 74/491 |
| 2010/0200295 | A1* | 8/2010 | Schimanski et al. ............ 175/45 |
| 2010/0303640 | A1* | 12/2010 | Greven et al. ................... 417/63 |
| 2011/0133949 | A1* | 6/2011 | Subramanian et al. .. 340/870.28 |
| 2013/0211740 | A1* | 8/2013 | Ramamurthy et al. ......... 702/42 |

* cited by examiner

*Primary Examiner* — Max Noori
(74) *Attorney, Agent, or Firm* — Ingrassia Fisher & Lorenz, P.C.

(57) ABSTRACT

A wireless torque measurement system includes a rotor, a rotor antenna, rotor electronics, a signal processing module, and a single ear antenna. The rotor antenna is attached to the rotor. The rotor electronics are attached to the rotor, and are configured to generate signals that indicate an amount of strain in the rotor and to transmit, via the rotor antenna, digital data representative thereof. The signal processing module is configured to generate signals that provide power and data to the rotor electronics module and process the digital data transmitted by the rotor electronics. The single ear stator is antenna coupled to the signal processing module and is configured to be inductively coupled to the rotor antenna.

16 Claims, 5 Drawing Sheets

SINGLE EAR STATOR ANTENNA FOR WIRELESS TORQUE MEASUREMENT SYSTEM

CROSS-REFERENCE TO RELATED APPLICATION

This application claims the benefit of U.S. Provisional Application No. 61/665,815, filed Jun. 28, 2012.

TECHNICAL FIELD

The disclosure relates to torque measurement systems, and, more particularly, to torque measurement systems including wireless telemetry systems.

BACKGROUND

A torque sensing system may measure and record torque applied to a component of a rotating system. Example rotating systems may include combustion engines, electric motors, drive shafts, and many other systems that have one or more rotating elements. A variety of different types of torque sensing systems may be used for measuring torque in rotating systems. In general, a torque sensing system may include sensors attached to the rotating portion of the system and may include stationary electronics that are located off of the rotating portion. In some examples, a slip ring and brush system may make a communication connection between rotating sensors and stationary electronics. In other examples, communication between the rotating sensors and stationary electronics is wireless.

The above-mentioned wireless torque measurement systems can have tight alignment requirements between the rotor and stator for sufficient power transfer from the stator to the rotor, and for proper data transfer from the rotor to the stator. For example, in some instances the gap between the rotor and stator antenna may be about 2-3 mm and allows a maximum of ±2-3 mm misalignment. Considering that these systems can be mounted on shafts rotating at high speeds, such alignment requirement poses a tough challenge to equipment developers and assemblers.

In the event of misalignment, some parts of the torque measurement system may be permanently damaged causing equipment downtime till a replacement is obtained. Further each such antenna set is tuned and tuning process can be difficult based on range of capacitance available for tuning at a particular RF carrier frequency like 13.56 MHz.

BRIEF SUMMARY

In one embodiment, a wireless torque measurement system includes a rotor, a rotor antenna, rotor electronics, a signal processing module, and a single ear antenna. The rotor antenna is attached to the rotor. The rotor electronics are attached to the rotor, and are configured to generate signals that indicate an amount of strain in the rotor and to transmit, via the rotor antenna, digital data representative thereof. The signal processing module is configured to generate signals that provide power and data to the rotor electronics module and process the digital data transmitted by the rotor electronics. The single ear stator is antenna coupled to the signal processing module and is configured to be inductively coupled to the rotor antenna.

In another embodiment, a wireless torque measurement system includes a rotor, a rotor antenna, a strain detection device, a programmable gain amplifier, a control module, a signal processing module, and a single ear antenna. The rotor antenna is attached to the rotor. The strain detection device is attached to the rotor and is configured to generate signals that indicate an amount of strain in the rotor. The programmable gain amplifier is attached to the rotor and is configured to amplify the signals generated by the strain detection device by a programmable gain value. The control module is attached to the rotor and configured to supply the programmable gain value and to transmit, via the rotor antenna, digital data that is derived from amplified signals. The signal processing module is configured to generate signals that provide power and data to the rotor electronics module and process the digital data transmitted by the rotor electronics. The single ear stator antenna is coupled to the signal processing module and is configured to be inductively coupled to the rotor antenna. The single ear antenna includes a printed circuit board having a plurality of an arc-shaped traces formed thereon to form a helical coil.

Furthermore, other desirable features and characteristics of the wireless torque measurement system will become apparent from the subsequent detailed description and the appended claim, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A torque measurement system of the present disclosure may determine an amount of torque being applied to a static or moving object in real-time. For example, the torque measurement system of the present disclosure may determine an amount of torque being applied to a rotor as the rotor is rotating. The torque measurement system may include a strain detection device (e.g., one or more strain gauges) mounted (i.e., attached) to the rotor and configured to measure an amount of strain in the rotor. The rotor of the torque measurement system may also include rotor electronics and a rotor antenna. The rotor electronics may transmit data derived from the strain measurements off of the rotating rotor via the rotor antenna. The torque measurement system may include a single ear stator antenna arranged adjacent to the rotor that supplies power to, and receives the data transmitted from, the rotor antenna.

Figure 1:
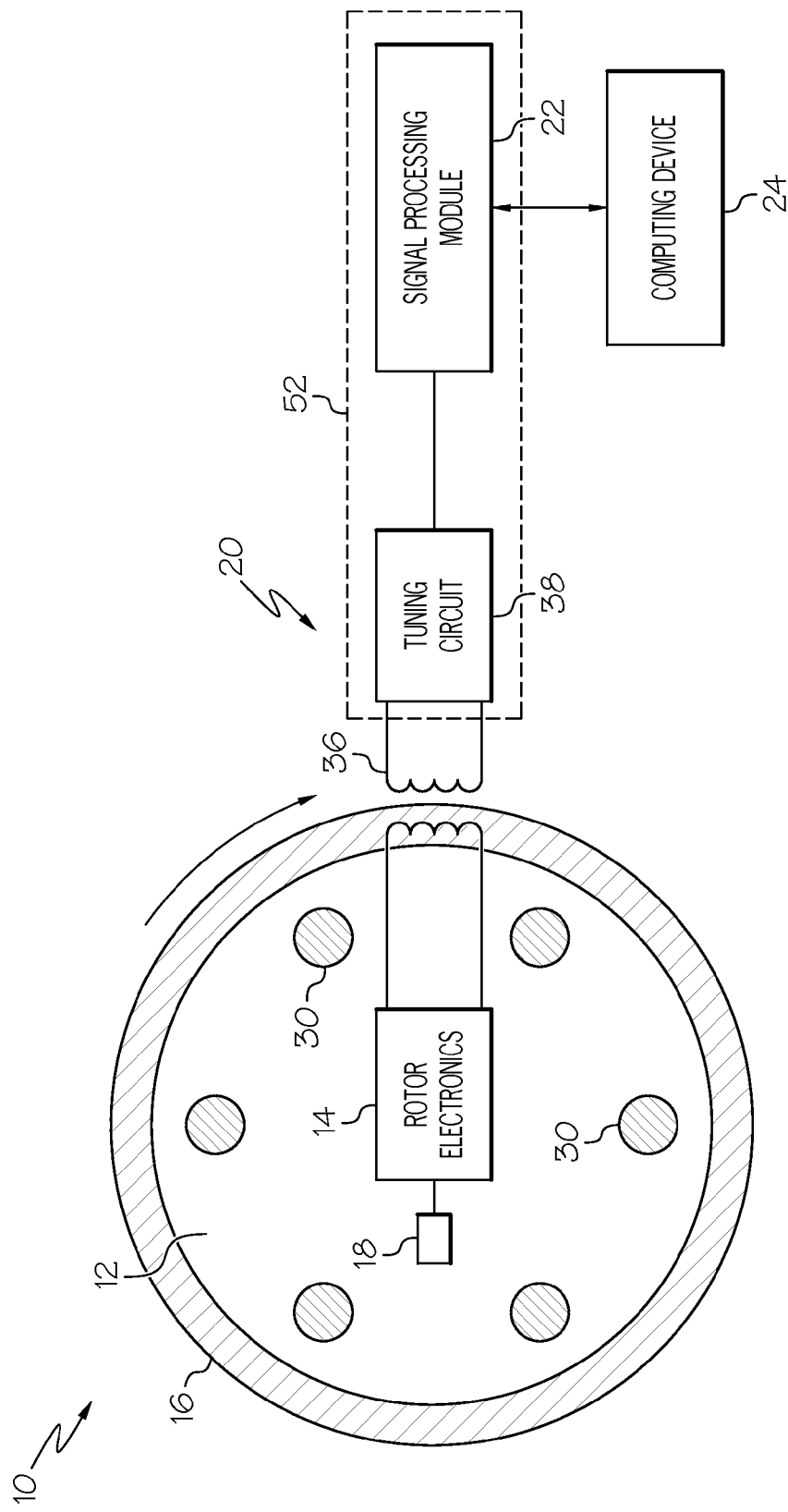
FIGS. 1-2 are block diagrams that show an example torque measurement system that determines an amount of torque being experienced by a rotor.
Figure 2:
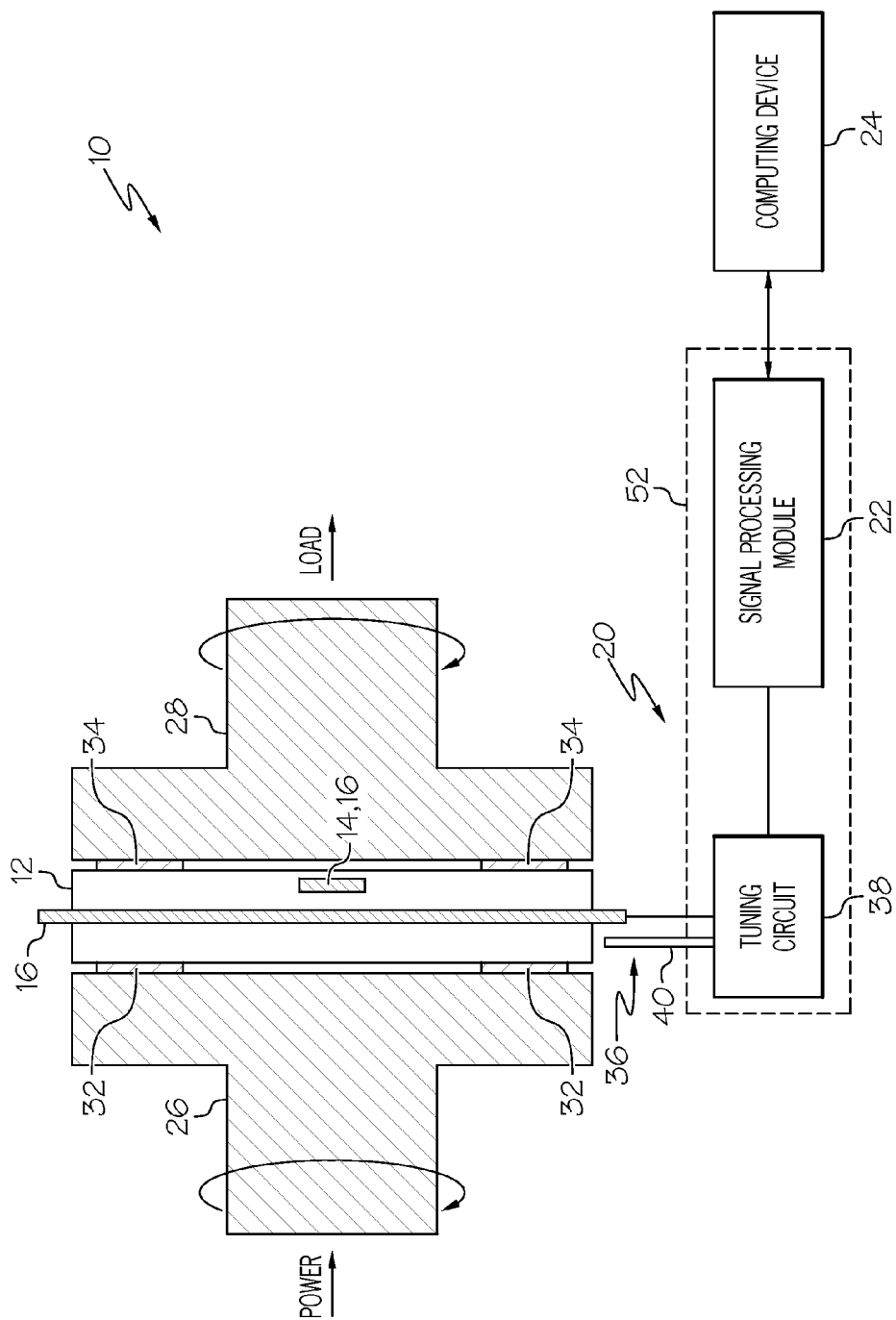

Referring first to FIGS. 1 and 2, block diagrams of an example torque measurement system 10 that determines an amount of torque being experienced by a rotor 12 are depicted. Torque measurement system 10 includes rotating components and stationary components. Rotating components may include rotor 12, rotor electronics 14, a rotor antenna 16, and a strain detection device 18. Stationary components may include a stator module 20, and a computing device 24.

Before proceeding further, it is noted that modules of the present disclosure may represent functionality that may be included in torque measurement system 10 of the present disclosure. Modules of the present disclosure may include any discrete and/or integrated electronic circuit components that implement analog and/or digital circuits capable of producing the functions attributed to the modules herein. For example, the modules may include analog circuits, e.g., amplification circuits, filtering circuits, and/or other signal conditioning circuits. The modules may also include digital circuits, e.g., combinational or sequential logic circuits, memory devices, etc. Memory may include any volatile, non-volatile, magnetic, or electrical media, such as a random access memory (RAM), read-only memory (ROM), non-volatile RAM (NVRAM), electrically-erasable programmable ROM (EEPROM), Flash memory, or any other memory device. Furthermore, memory may include instructions that, when executed by one or more processing circuits, cause the modules to perform various functions attributed to the modules herein.

The functions attributed to the modules herein may be embodied as one or more processors, hardware, firmware, software, or any combination thereof. Depiction of different features as modules is intended to highlight different functional aspects and does not necessarily imply that such modules must be realized by separate hardware or software components. Rather, functionality associated with one or more modules may be performed by separate hardware or software components, or integrated within common or separate hardware or software components.

Torque measurement system 10 may be included in a variety of different testing systems in order to measure torque values associated with those testing systems. In some examples, torque measurement system 10 may be used in an automotive powertrain testing system that is configured to test torque values associated with an engine, transmission, driveshaft, wheels, etc. In other examples, torque measurement system 10 may be used in a pump testing system or an electric motor testing system that is configured to measure torque values associated with those systems. Although torque measurement system 10 may be included in the above described systems, it is contemplated that torque measurement system 10 may be used to determine torque in any general mechanical system.

Components of an example testing system may be illustrated herein by a driving shaft 26 and an output shaft 28. Driving shaft 26, attached to rotor 12, may be driven by a power source, such as a combustion engine or an electric motor. Driving shaft 26 may be coupled to output shaft 28 via rotor 12 such that driving shaft 26 applies a torque to rotor 12, which in turn applies a torque to output shaft 28. Output shaft 28 may represent a component of a testing system that may attach to a load. Rotor 12 may comprise a metal disk (e.g., a flange) including holes (e.g., 30) for attachment to driving shaft 26 and output shaft 28. Rotor 12 may be attached to driving shaft 26 on one side and output shaft 28 on the other side. For example, with respect to FIG. 2, rotor 12 may include a first face that is attached to driving shaft 26 using fasteners 32. In some examples, fasteners 32 may comprise bolts that are fit through matching holes defined in both driving shaft 26 and rotor 12. A second face of rotor 12 may be attached to output shaft 28 using fasteners 34. In some examples, fasteners 34 may comprise bolts that are fit through matching holes defined in both output shaft 28 and rotor 12.

Rotor electronics 14 and strain detection device 18 may be mounted (i.e., attached) to rotor 12. Rotor electronics 14 may provide power to strain detection device 18. Strain detection device 18 may generate signals (e.g., voltage signals) that indicate an amount of strain in rotor 12. The signals generated by strain detection device 18 that indicate the amount of strain in rotor 12 may be referred to herein as "strain signals." Rotor electronics 14 may receive the strain signals generated by strain detection device 18. Rotor electronics 14 may amplify the strain signals received from strain detection device 18. The strain signals amplified by rotor electronics 14 may be referred to herein as "amplified strain signals." Rotor electronics 14 may digitize the amplified strain signals, e.g., using an analog-to-digital converter. The digitized signals may be referred to herein as "raw strain data" or as "strain data." Rotor electronics 14 may transmit the strain data to stator module 20 via a rotor antenna 16 using a detuning operation. For example, rotor electronics 14 may transmit data using an amplitude shift keying scheme.

Rotor antenna 16 (e.g., an inductor or other antenna) may be attached to rotor 12 and may rotate along with rotor 12. As illustrated in FIGS. 1-2, rotor antenna 16 may be in the form of a ring that is fixed to rotor 12 around the circumference of rotor 12. In some examples, rotor antenna 16 may comprise an antenna (e.g., illustrated as an inductor in FIG. 1) that is embedded in a printed circuit board (PCB) that is configured to fit around the circumference of rotor 12. Although rotor antenna 16 is illustrated as a ring that is fixed around the circumference of rotor 12, it is contemplated that a rotor antenna having different form factors may be used in torque measurement system 10.

Stator module 20 includes a signal processing module 22, a stator antenna 36, and a passive tuning network 38 (e.g., a circuit), and is disposed stationary relative to rotor antenna 16. Signal processing module 22 and passive tuning network are both preferably disposed within the same housing 52, and stator antenna 36 extends from this housing 52.

Signal processing module 22 may generate and supply an RF signal to the stator antenna 36, via the passive tuning network 38, for transmission from stator antenna 36 to rotor antenna 16. Thus, as may be appreciated, rotor electronics 14 may be powered by the RF signal received via rotor antenna 16. For example, rotor electronics 14 may be powered by the RF signal while rotor 12 is rotating, and while rotor 12 is stationary. Rotor electronics 14 and signal processing module 22 may communicate with one another via antennas 16, 36 while rotor 12 is rotating, and while rotor 12 is stationary. Power transfer from signal processing module 22 to rotor electronics 14 and communication between signal processing module 22 and rotor electronics 14 are described hereinafter.

Signal processing module 22 may include an RF generator module (not illustrated in FIGS. 1 and 2) that generates the RF signal (e.g., a carrier signal at 6.78 MHz or 13.56 MHz) that, as just described, supplies electrical power to rotor electronics 14. Because the RF generator 22 is disposed within the same housing 52 as passive tuning circuit 38, the RF signal may be transferred from signal processing module 22 to passive tuning network 38 without using a length of RF cable.

Signal processing module 22 and rotor electronics 14 may communicate with one another. For example, signal processing module 22 may transmit data to rotor electronics 14 by varying the amplitude of the RF signal. In some examples, the data transmitted to rotor electronics 14 may include gain values to be programmed into a programmable gain amplifier 46 of rotor electronics 14, or other values which may be used by rotor electronics 14 to determine a gain value to be programmed into programmable gain amplifier 46. Rotor electronics 14 may transmit strain data, or other data, to signal processing module 22 by detuning a circuit in rotor electronics 14. Rotor antenna 16 and stator antenna 36 may be configured (e.g., arranged) such that rotor antenna 16 and stator antenna 36 remain in communication with one another while rotor 12 is rotating, and while rotor 12 is stationary. In some examples, rotor antenna 16 and stator antenna 36 may be referred to as "inductively coupled."

Figure 5:
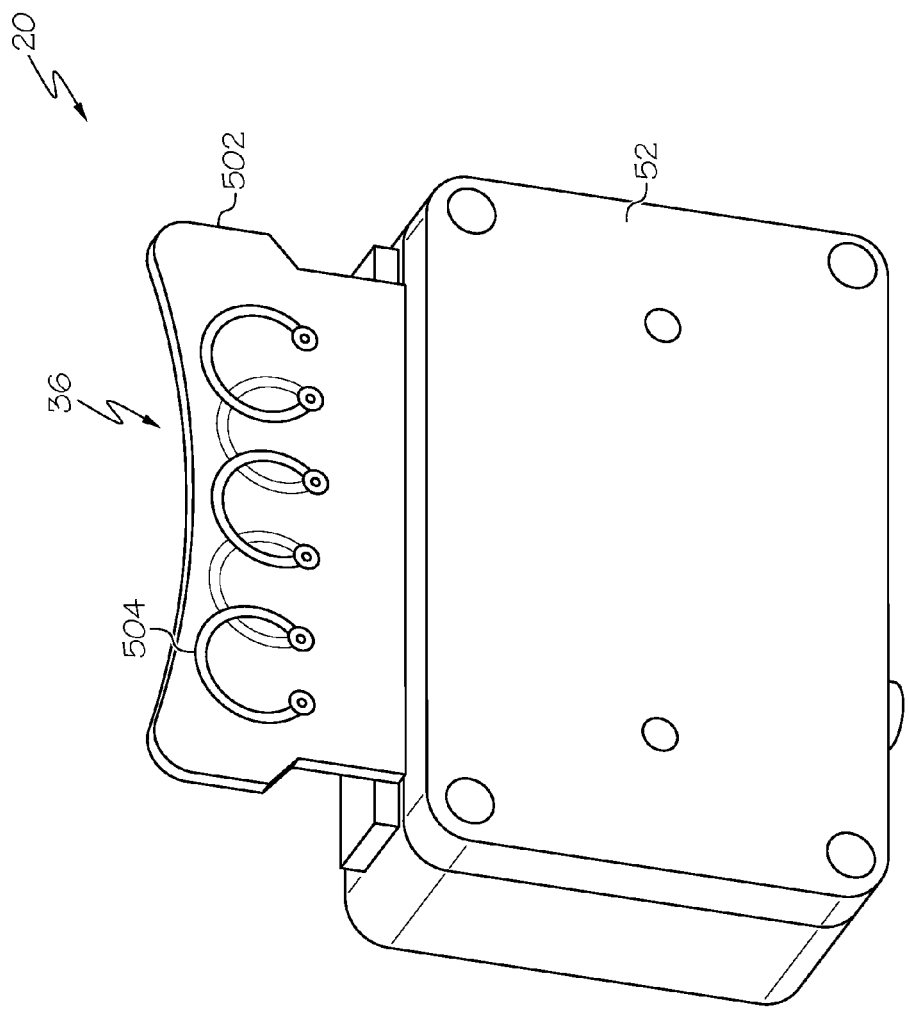
FIG. 5 depicts a plan view of one exemplary embodiment of a stator module of the torque measurement system of FIGS. 1-2.

Stator antenna 36 and rotor antenna 16 may be arranged such that a portion of rotor antenna 16 is in proximity to stationary stator antenna 36 while rotor antenna 16 is rotating. Moreover, as depicted more clearly in FIG. 2, stator antenna 36 includes a single ear 40, which is disposed adjacent rotor antenna 16. This single ear 40 configuration is significantly different than previously implemented stator antennas, in that previous configurations have included two ears. One embodiment of this stator antenna configuration is depicted in FIG. 5, and includes a single printed circuit board (PCB) 502 having a plurality of an arc-shaped traces 504 formed thereon to form a helical coil 506. The PCB 502 is coupled to and extends from the housing 52. The traces 504 may be variously implemented, but are preferably formed from two layers of copper. Though not depicted in FIG. 5, one or more components of passive tuning network 38 may also be mounted on PCB 502, either within or outside of housing 52. Passive tuning network 38 may include a network of passive components, such as resistors, capacitors, and/or inductors, for example. The components of passive tuning network 38 (e.g., capacitors) may be connected in series and/or parallel to tune stator antenna 36 to the desired carrier frequency.

Because stator antenna 36 is configured with only a single ear 40, it provides distinct advantages over dual-ear antennas. In particular, this configuration significantly reduces the likelihood of, if not eliminates the possibility of, mechanical damage to the stator antenna 36 and/or PCB 502 in the event of any axial or radial misalignment. The inductance of stator antenna 36 is also reduced to about half of a dual-ear antenna configuration, which allows for a wider range of capacitance, which in turn makes tuning relatively easier. This configuration allows the stator antenna 36 to be disposed further from enclosure 52 than dual-ear configurations, which also results in improved tuning capabilities. Better tuning capabilities leads to increased voltage recovery at rotor electronics 14 and higher received signal strength at stator antenna 36. Moreover, because it includes only a single ear 40, the signal processing module 22 may be disposed with enclosure 52, which reduces radiated emission levels and eliminates the need for RF cable.

Returning now to FIGS. 1 and 2, computing device 24 may comprise a general purpose computing device, such as a desktop computer, laptop computer, tablet computer, handheld computer, or smartphone. Alternatively, computing device 24 may be a specific-purpose computer implemented specially for interacting with torque measurement system 10.

In any case, a user may interact with torque measurement system 10 using computing device 24. In one example, a user may program torque measurement system 10 using computing device 24. For example, the user may enter expected torque values into computing device 24, which torque measurement system 10 may use to determine gain values for programmable gain amplifier 46, as described hereinafter. In some examples, the user may view and store data generated by torque measurement system 10 using computing device 24. Example data that may be viewed and stored using computing device 24 may include strain data, torque data, or other data derived from the strain data, for example.

Torque measurement system 10 may determine an amount of torque being applied to rotor 12 (e.g., an amount of torque applied to driving shaft 26) based on the strain data (e.g., digitized strain signals) generated by rotor electronics 14. In some examples, rotor electronics 14 may determine an amount of torque being applied to rotor 14 based on the strain data. In other examples, rotor electronics 14 may transmit the strain data to signal processing module 22, which may then determine the amount of torque being experienced by rotor 14 based on the strain data. In still other examples, computing device 24 may determine the amount of torque being applied to rotor 14 based on the strain data.

Figure 3:
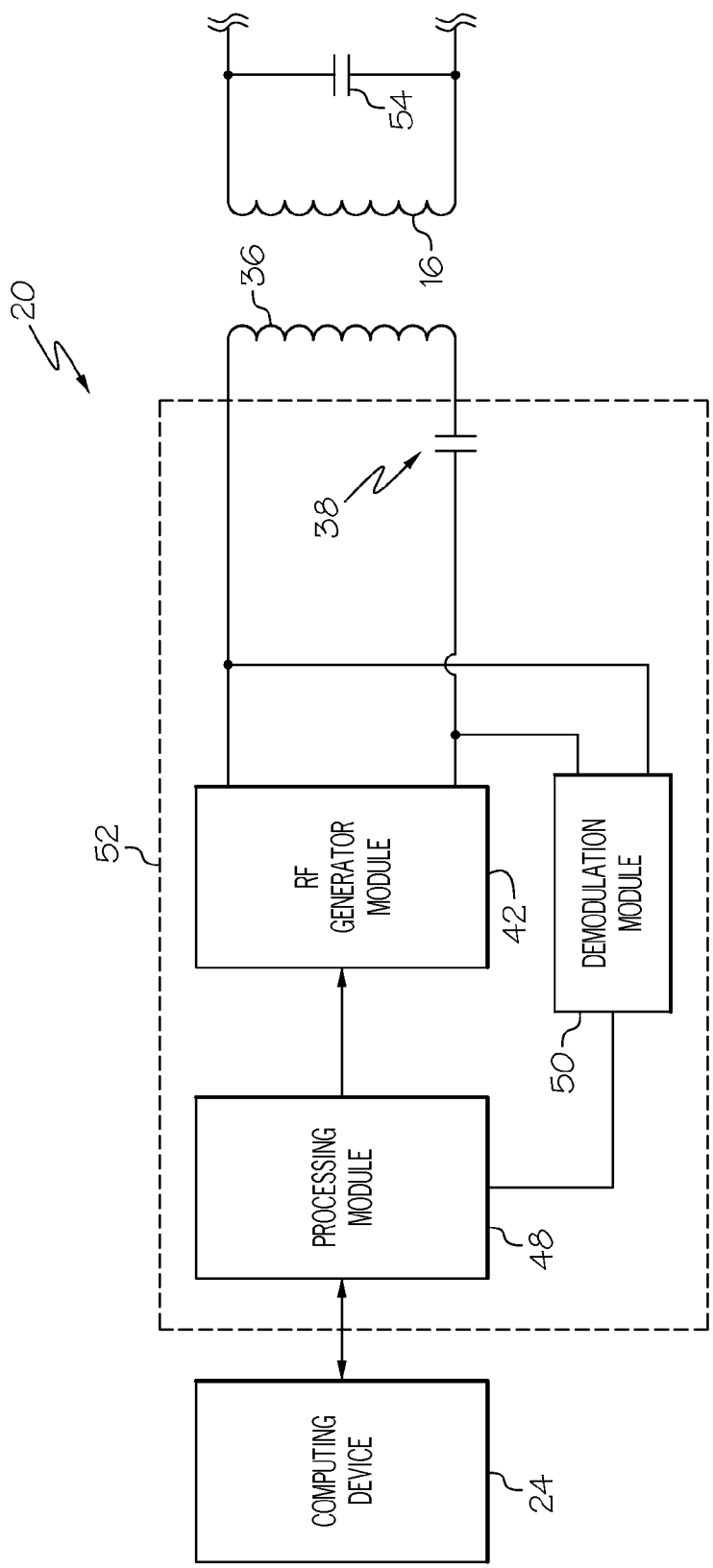
FIG. 3 is a functional block diagram that shows an example signal processing module of the torque measurement system of FIGS. 1-2.

For completeness, operation of stator module 20 and rotor electronics 14 will now described with reference to FIGS. 3-4. Referring first to FIG. 3, it is seen that signal processing module 22 includes the previously mentioned RF generator module 42, a processing module 48, and a demodulation module 50, all preferably disposed within enclosure 52 as passive tuning network 38. It should be noted that in the embodiment depicted in FIG. 3, although passive tuning network 38 is illustrated as a single capacitor connected in series with stator antenna 36, passive tuning network could include various other passive components, as needed or desired.

RF generator module 42 may generate an RF signal that is transmitted via stator antenna 36 to rotor antenna 16. The RF signal transmitted by RF generator module 42 may provide power to rotor electronics 14 and strain detection device 18. In some examples, RF generator module 42 may generate RF signals at 6.8 MHz or 13.56 MHz. RF generator module 42 may generate approximately 1 Watt of RF power. Rotor electronics 14 may consume approximately 150-200 mW.

In addition to transmitting power to rotor electronics 14, signal processing module 22 may send data to rotor electronics 14 by changing the amplitude of the generated RF signal. For example, RF generator module 42 may generate an RF signal having a first amplitude (e.g., peak to peak voltage) in order to represent a first binary value (e.g., 1), and generate an RF signal having a second amplitude to represent a second binary value (e.g., 0). Both of the first and second amplitudes may provide sufficient power to rotor electronics 14 so that power delivered to rotor electronics 14 remains stable when data is transmitted by RF generator module 42. In some examples, the second RF signal amplitude may be approximately 75% or more of the first RF amplitude.

Processing module 48 may control RF generator module 42 in order to send data to rotor electronics 14. For example, processing module 48 may control RF generator module 42 to modulate the amplitude of the RF signal generated by RF generator module 42 in order to send data to rotor electronics 14. The data sent to rotor electronics 14 may be referred to herein as "configuration data." The configuration data may include a variety of different parameters that are to be programmed into rotor electronics 14. In some examples, the configuration data may include a gain value that rotor electronics 14 may program into programmable gain amplifier 46.

In other examples, rotor electronics 14 may derive the gain value from the configuration data. For example, the configuration data may include an expected torque value which rotor electronics 14 may use to determine the gain value. In some examples, processing module 48 may receive configuration data from computing device 24. The configuration data received from computing device 24 may be data entered into computing device 24 by a user, or may be data generated by computing device 24.

In addition to transmitting data to rotor electronics 14, signal processing module 22 may also receive data that is transmitted from rotor electronics 14. In general, rotor electronics 14 may detune a circuit of rotor electronics 14 in order to communicate data to signal processing module 22. Demodulation module 50 may detect the detuning in rotor electronics 14, demodulate the detected signals, and generate digital data based on the detected signals.

Processing module 48 may receive the digital data from demodulation module 50 and send the data to computing device 24 for storage, analysis, and/or display to the user. In some examples, the data received from rotor electronics 14 at processing module 48 may include strain values. In other examples, the data received from rotor electronics 14 may include other data, such as torque values which were derived from strain data by rotor electronics 14. Computing device 24 may display the strain values and/or the torque values to the user and store the strain/torque values for subsequent analysis. In other examples, the data received from rotor electronics 14 may include a currently programmed gain value. For example, a user may use computing device 24 to query a current gain value used in programmable gain amplifier 46 of rotor electronics 14, and, in response to the query, rotor electronics 14 may transmit the gain value back to processing module 48.

Figure 4:
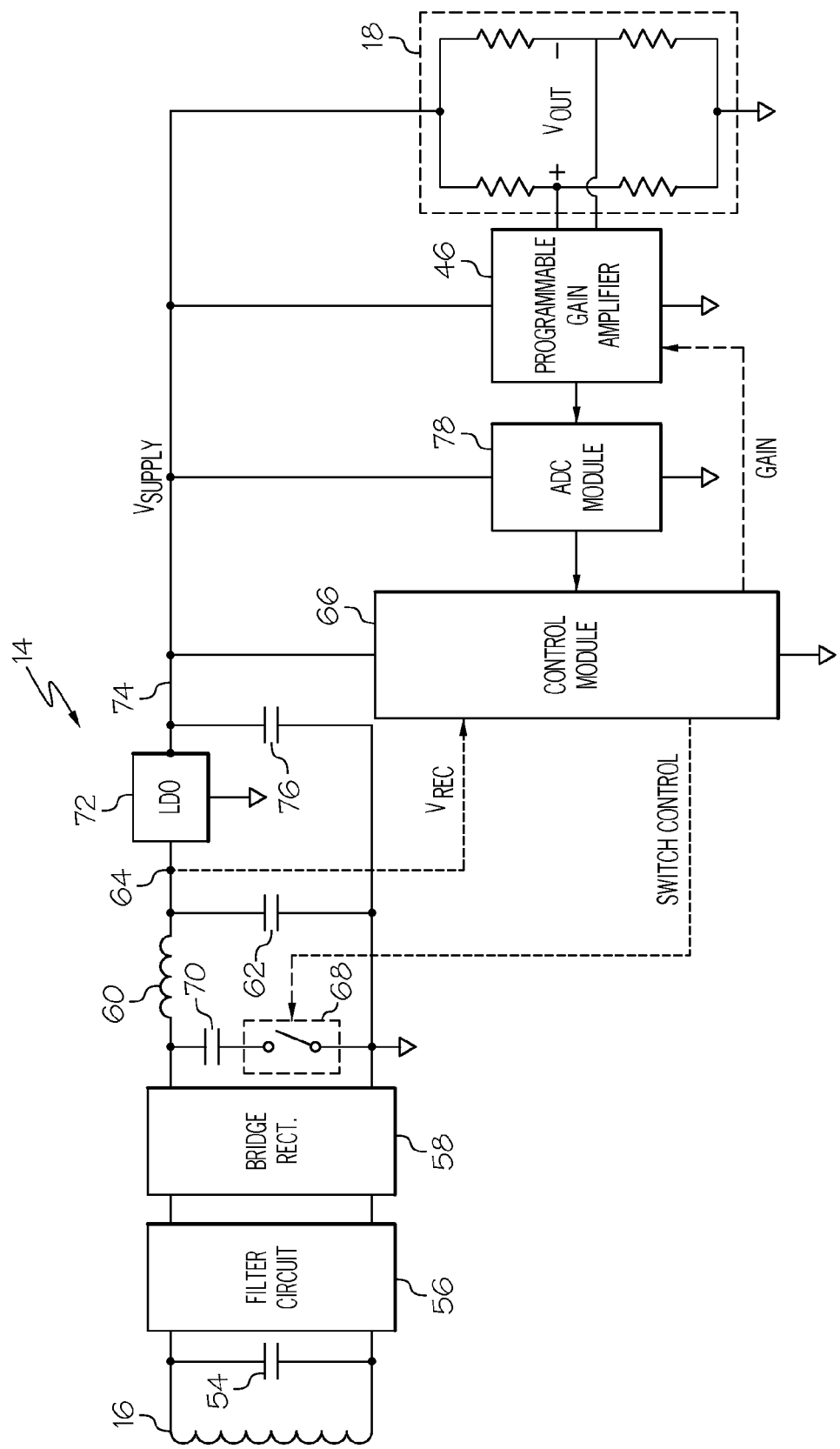
FIG. 4 is a circuit schematic that includes a rotor antenna, rotor electronics, and a strain detection device included in the torque measurement system of FIGS. 1-2.

FIG. 4 is a schematic including rotor antenna 16, rotor electronics 14, and strain detection device 18. The components illustrated in FIG. 4, besides rotor antenna 16 and strain detection device 18, are example components that may be included in rotor electronics 14. Rotor antenna 16 may receive the RF signal generated by RF generator module 42. Capacitor 54 may be a tuning capacitor in parallel with rotor antenna 16. Filter circuit 56 and bridge rectifier 58 may filter and rectify the received RF signal, respectively. Inductor 60 and capacitor 62 may filter out AC components of the rectified RF signal to generate a quasi-DC voltage at node 64, e.g., a DC voltage having a small AC ripple.

In some examples, control module 66 may selectively close switch 68 to switch capacitor 70 into the circuit in order to detune the circuit. When capacitor 70 is switched into the circuit, capacitor 70 may be connected in parallel with tuning capacitor 54, which may cause a detuning of the circuit. As described herein, control module 66 may communicate information back to signal processing module 22 by selectively closing switch 68 to detune the circuit (e.g., using an amplitude shift keying scheme).

The voltage at node 64 may be referred to as a recovered voltage ("$V_{REC}$"). $V_{REC}$ may be a relatively stable DC voltage with a small AC ripple. Low drop-out regulator 72 (hereinafter "LDO 72") may regulate $V_{REC}$ to generate a supply voltage $V_{SUPPLY}$ at node 74. Capacitor 76 may remove the remaining AC components from $V_{SUPPLY}$. In some examples, $V_{REC}$ may be a DC voltage from approximately 3.3-9V, depending on the RF signal received at rotor antenna 16. LDO 72 may be configured to output a regulated DC supply voltage. For example, $V_{SUPPLY}$ may be a DC voltage in the range of approximately 3.3-5.5V, depending on the configuration of LDO 72.

Node 74 may provide $V_{SUPPLY}$ to control module 66, ADC module 78, programmable gain amplifier 46, and strain detection device 18. Strain detection device 18 is illustrated as a Wheatstone bridge circuit that receives $V_{SUPPLY}$ and generates an output voltage $V_{OUT}$. Strain detection device 18 may be configured in a variety of different ways. For example, one or more resistors of strain detection device 18 may comprise strain gauges. Each strain gauge may comprise one or more strain gauge elements. In some examples, strain detection device 18 may include only a single strain gauge. In other examples, strain detection device 18 may include multiple strain gauges. Regardless of the number of strain gauges included in strain detection device 18, strain detection device 18 may generate an output voltage $V_{OUT}$ that indicates an amount of strain in rotor 12. The output voltage $V_{OUT}$ of strain detection device 18 may also be referred to herein as a strain signal.

Programmable gain amplifier 46 receives strain signal $V_{OUT}$ and amplifies $V_{OUT}$ by a programmable gain value to generate an amplified strain signal at the output of programmable gain amplifier 46. In other words, the amplified strain signal output to ADC module 78 is equal to the product of the gain value and $V_{OUT}$. In some examples, programmable gain amplifier 46 may include a differential amplification circuit that amplifies input voltage $V_{OUT}$ by the gain value (e.g., an instrumentation amplifier). The gain value of programmable gain amplifier 46 may be set (i.e., programmed) by control module 66. In some examples, control module 66 may be a microcontroller, or similar electronic hardware, that programs programmable gain amplifier 46 using an established interface standard, such as Inter-Integrated Circuit ($I^2C$), Serial Peripheral Interface (SPI), etc.

ADC module 78 may perform an analog-to-digital conversion operation on the amplified strain signals received from programmable gain amplifier 46 to generate digital data (i.e., raw strain data) that indicates the amount of strain in rotor 12. In some examples, ADC module 78 may perform 24-bit conversions at rates of approximately 10-128 thousand samples per second, although other values are contemplated. ADC module 78 may output the raw strain data to control module 66. Control module 66 may transmit, via rotor antenna 16, data that is derived from the amplified strain signals. In some examples, control module 66 may transmit the raw strain data, as received from ADC module 78, to signal processing module 22. In other examples, control module 66 may derive other data based on the raw strain data received from ADC module 78. For example, control module 66 may perform processing operations on the raw strain data, such as averaging or filtering. Control module 66 may also derive torque values based on the raw strain data and then transfer the torque values to signal processing module 22 via rotor antenna 16.

Control module 66 may control switch 68 to transmit data (e.g., strain data and/or torque values) to signal processing module 22. For example, control module 66 may selectively open and close switch 68 to send data to signal processing module 22. Typically, control module 66 may command switch 68 to remain in an open state. In order to transmit data, control module 66 may selectively close switch 68 to connect capacitor 70 into the circuit, which may cause a detuning of the circuit. This detuning may be received at signal processing module 22. For example, demodulation module 50 may demodulate the received signal, including the detuning component, and generate data that may be interpreted by processing module 48. In some examples, control module 66 may be a microcontroller, or a similar electronic component. In these examples, control module 66 may control switch 68 using a general purpose input/output pin, or other pin configured to transmit data. Switch 68 may be a metal-oxide-semiconductor field-effect-transistor (MOSFET) switch in some examples.

As described above, signal processing module 22 may send data to rotor electronics 14 by changing the amplitude of the generated RF signal. A change in the amplitude of the RF signal may cause a change in $V_{REC}$, which may be detected by control module 66. Control module 66 may monitor the voltage $V_{REC}$ to detect data being sent from signal processing module 22.

In some examples, $V_{REC}$ may take on one of two different amplitudes in examples where processing module 48 controls RF generator module 42 to generate an RF signal having two different amplitudes. In such examples, $V_{REC}$ may define a first amplitude when RF generator module 42 generates an RF signal having a first amplitude. $V_{REC}$ may define a second amplitude when RF generator module 42 generates an RF signal having a second amplitude. In general, an RF signal having greater amplitude may generate greater values of $V_{REC}$. Thus, $V_{REC}$ may define a wide range of values in some examples. Control module 66 may monitor the voltage level of $V_{REC}$ and, based on the voltage level of $V_{REC}$ (e.g., as compared to a threshold voltage), retrieve the information that was transmitted by processing module 48. In other words, control module 66 may detect the value of $V_{REC}$ and retrieve the digital data (e.g., the configuration data) based on the detected value of $V_{REC}$. Both of the first and second amplitudes of $V_{REC}$ may provide sufficient power to rotor electronics 14 so that power delivered to rotor electronics 14 remains stable when data is transmitted by signal processing module 22 and detected by control module 66. Although processing module 48 may control RF generator module 42 to generate RF signals having two amplitudes, resulting in two different values of $V_{REC}$, in some examples, processing module 48 may control RF generator module 42 to generate RF signals having more than two amplitudes, which may cause $V_{REC}$ to take on greater than two different values.

Control module 66 may monitor $V_{REC}$ in a variety of different ways. In some examples, control module 66 may monitor $V_{REC}$ by performing a multi-bit analog-to-digital conversion on $V_{REC}$. In these examples, control module 66 may retrieve the digital data sent by processing module 22 based on the magnitude of $V_{REC}$. In examples where control module 66 includes a microcontroller, or a similar electronic component, control module 66 may include an input (e.g., an input pin) to which node 64 is connected. Such an input pin may be an input to an analog-to-digital converter of control module 66 that digitizes the value of $V_{REC}$.

The gain value of programmable gain amplifier 46 may be set to a variety of different values. In general, the adjustability of the programmable gain value may allow torque measurement system 10 to be used effectively in a variety of different testing systems that generate a variety of different torque values. The programmable gain may provide flexibility to torque measurement system 10 because the programmable gain value may allow for accurate amplification and digitization of a wide range of strain signals.

In order to provide an accurate measurement of torque, programmable gain amplifier 46 may have a gain value that amplifies the strain signals as much as possible without saturating programmable gain amplifier 46. For example, it may be beneficial for programmable gain amplifier 46 to amplify received strain signals using a large enough gain value so that the digitized strain data can be represented by the total number of representations available by ADC module 78. However, the magnitude of the gain value should not be so large that amplification of the largest strain signals may cause saturation of programmable gain amplifier 46, which may be undesirable since it may result in the loss of meaningful information. Accordingly, the gain value of programmable gain amplifier 46 may be set such that the largest expected torque applied by the testing system does not saturate programmable gain amplifier 46, but, at the same time, the gain value may be large enough to sufficiently amplify strain signals generated by the smaller expected torque values generated in the testing system.

A torque measurement system that includes a fixed gain amplifier, instead of a programmable gain amplifier, may not be reprogrammed to accommodate for changing torque values. Instead, a fixed gain amplifier may amplify strain signals generated by a strain detection device using a fixed gain value. A fixed gain amplifier may be appropriate for some testing systems, but not for others. For example, if the strain signals generated in the testing system allow for amplification by the fixed gain amplifier without saturation of the fixed gain amplifier, then the use of a fixed gain amplifier may be acceptable. However, if a fixed gain amplifier is used in a testing system in which the strain signals are larger, then it is possible that the fixed gain amplifier would saturate, and, therefore, cause a loss of torque information. If a fixed gain amplifier is used in a testing system in which the strain signals are relatively small, then it is possible that the fixed gain amplifier would not adequately amplify the strain signals such that the full output voltage of the fixed gain amplifier is utilized, which may result in a decrease in the accuracy of torque measurements. Accordingly, torque measurement system 10 including programmable gain amplifier 46 may provide flexibility and accuracy when measuring torque, especially when compared to a torque measurement system including a fixed gain amplifier.

The magnitude of the strain signal $V_{OUT}$ may vary based on the amount of strain in rotor 12. In other words, the magnitude of the strain signal $V_{OUT}$ may vary based on the amount of torque applied to rotor 12. It may be assumed that larger strains applied to strain detection device 18 may tend to generate larger strain signals. It may also be assumed that smaller strains applied to strain detection device 18 may tend to generate smaller strain signals. The range of torques generated by a device under test may range from a value of zero up to a maximum torque value. Strain detection device 18 may generate the smallest amplitude signal (e.g., approximately 0V) when the torque experienced by rotor 12 is approximately zero. Strain detection device 18 may generate the largest amplitude signal when the torque experienced by rotor 12 is at a maximum torque value for the device under test.

The maximum torque value experienced by rotor 12 may depend on the type of device connected to driving shaft 26, the load attached to output shaft 28, and how the device under test is operated (e.g., an amount of power generated by the device). In some examples, it may be preferable to set the gain value of programmable gain amplifier 46 such that the output voltage of programmable gain amplifier 46 may not saturate (i.e., clip) under the highest torque applied to rotor 12. Such a gain value may provide one or more advantages. For example, such a gain value may give the user, or control module 66 when automatic gain is enabled, the ability to observe an ever increasing amount of torque and predict potential saturation of programmable gain amplifier 46. Such a gain value may also provide a safety margin with respect to the maximum torque that produces saturation.

In some examples, it may be desirable to provide adequate amplification of the smaller strain signals generated by strain detection device 18. The gain value of programmable gain amplifier 46 may be selected by a user according to this desire. For example, a user may select the gain value such that smaller strain signals generated by strain detection device 18 may be amplified sufficiently for digital conversion, while larger strain signals may be amplified to a voltage that is near the saturation voltage of programmable gain amplifier 46 without clipping. In examples where the entire range of torques applied to rotor 12 are of interest to a user, the user may program the gain value of programmable gain amplifier 46 such that the output of programmable gain amplifier 46 does not saturate. In examples where torque values in a lower range of torques are of interest, the user may program the gain value of programmable gain amplifier 46 such that smaller strain signals may be amplified, and such that larger strain values may saturate programmable gain amplifier 46 since such larger strain values may not be of interest.

The range of gain values which may be programmed into programmable gain amplifier 46 may vary. In some examples, depending on the sensitivity of strain detection device 18 and the amount of strain that may be experienced by rotor 12, the strain signals may range in amplitude from tenths of millivolts up to 10 mV, or more. In examples where $V_{SUPPLY}$ is approximately 5V and the maximum expected strain signal has an amplitude of 2 mV, a gain value of approximately 2500 may tend to saturate programmable gain amplifier 46. Accordingly, in examples where strain signals are expected to be in the range of approximately 0-2 mV and $V_{SUPPLY}$ is 5V, the gain value of programmable gain amplifier 46 may be set up to 2500 without causing saturation of programmable gain amplifier 46. In examples where $V_{SUPPLY}$ is approximately 5V and the maximum expected strain signal has an amplitude of 10 mV, a gain value of 500 may tend to saturate programmable gain amplifier 46. Accordingly, in examples where strain signals are expected to be in the range of approximately 0-10 mV and $V_{SUPPLY}$ is 5V, the gain value of programmable gain amplifier 46 may be set up to 500 without causing saturation of programmable gain amplifier 46.

It may be assumed that ADC module 78 generates a maximum digital value when the output voltage of programmable gain amplifier 46 is at, or near, saturation. Accordingly, control module 66 may determine that the output voltage of programmable gain amplifier 46 is at, or near, saturation when control module 46 receives maximum digital values from ADC module 78. In general, a greater number of consecutive maximum digital values received from ADC module 78 may tend to be a stronger indication of saturation of programmable gain amplifier 46. In some examples, control module 66 may be configured to detect saturation when a threshold number of digital values received from ADC module 78 are at the maximum digital value.

In some examples, control module 66 may automatically adjust the gain value of programmable gain amplifier 46 in order to prevent programmable gain amplifier 46 from reaching saturation, or in order to bring programmable gain amplifier 46 out of saturation. Control module 66 may determine that the output voltage of programmable gain amplifier 46 is at, or near, saturation when greater than a threshold number of digital values received from ADC module 78 are greater than a threshold value, e.g., at, or near, the maximum digital value of ADC module 78. Control module 66 may adjust (e.g., decrease) the gain value of programmable gain amplifier 46 in response to a determination that programmable gain amplifier 46 is at, or near, saturation in order to prevent saturation of programmable gain amplifier 46, or in order to bring programmable gain amplifier 46 out of saturation. In some examples, control module 66 may also adjust (e.g., increase) the gain value of programmable gain amplifier 46 in response to a determination that programmable gain amplifier 46 is not yet near saturation (i.e., is safely out of range of saturation) in order to improve the quality of the amplified signals for digital conversion.

A user may interact with torque measurement system 10 using computing device 24. For example, the user may view data generated by torque measurement system 10 on a display of computing device 24. The user may also store and analyze data generated by torque measurement system 10 using computing device 24.

The user may have control over the gain value programmed into programmable gain amplifier 46. In some examples, the user may manually enter a gain value into computing device 24. In these examples, computing device 24 may transfer the gain value to signal processing module 22, which in turn may transmit the gain value to control module 66 for programming into programmable gain amplifier 46.

In other examples, a user may not have direct knowledge of the gain values used by programmable gain amplifier 46. However, the user may generally have knowledge of the torque values that will be present in the testing system. For example, the user may have knowledge of the amount of torque that rotor 12 will be subjected to during testing. In these examples, the user may enter expected torque values into computing device 24. For example, the user may enter torque ranges or an expected maximum torque that will be experienced by rotor 12 during operation of the testing system.

One or more components of torque measurement system 10 may determine the gain value to be programmed into programmable gain amplifier 46 based on the expected maximum torque entered by the user. Generally, torque measurement system 10 may use a gain value that will not cause programmable gain amplifier 46 to saturate, but instead will allow for proper amplification of strain signals for a range of torque values up to the maximum torque value entered by the user.

In some examples, torque measurement system 10 may use a look-up table, or an equation, to determine the gain value to program into programmable gain amplifier 46 based on the maximum torque value entered by the user. In some examples, a predetermined amount of strain generated in rotor 12 may correspond to a predetermined amount of torque applied to rotor 12. The predetermined relationship between strain and torque may be included in a look-up table, or represented by an equation, which may be included in a component of torque measurement system 10, such as signal processing module 22, rotor electronics 14, or computing device 24. Using the look-up table, or equation, torque measurement system 10 may determine a maximum amount of strain that may be experienced by rotor 12. The maximum amount of strain in rotor 12 may correspond to a maximum strain signal amplitude. Torque measurement system 10 may include a look-up table, or equation, that relates the magnitude of the strain in rotor 12 and the magnitude of the strain signals. Using this look-up table, or equation, torque measurement system 10 may determine the maximum gain value to program into programmable gain amplifier 46 in order to amplify the strain signals sufficiently without saturating programmable gain amplifier 46 at higher torque values.

In some examples, computing device 24 may determine the gain value to program into programmable gain amplifier 46 based on the expected torque value entered by the user. For example, computing device 24 may include the lookup table(s) and/or equation(s) that computing device 24 may use to determine a gain value based on an expected torque value.

In other examples, signal processing module 22 may determine the gain value to program into programmable gain amplifier 46 based on the expected torque value entered by the user. For example, signal processing module 22 may include the lookup table(s) and/or equation (s) that signal processing module 22 may use to determine a gain value based on an expected torque value. In still other examples, control module 66 may determine the gain value to program into programmable gain amplifier 46 based on the expected torque value entered by the user. For example, control module 66 may include the lookup table(s) and/or equation (s) that control module 66 may use to determine a gain value based on an expected torque value.

In some examples, control module 66 may update the gain value automatically in order to prevent saturation of programmable gain amplifier 46. Control module 66 may update the gain value automatically instead of, or in addition to, receiving a user specified torque value via computing device 24. The user may input into computing device 24 a command that instructs control module 66 to automatically update the gain value of programmable gain amplifier 46 in order to initiate automatic updating of the gain value.

In response to receipt of the automatic update command, control module 66 may begin automatically controlling the gain value of programmable gain amplifier 46 to prevent saturation, as described above. While control module 66 is automatically controlling the gain value of programmable gain amplifier 46, control module 66, or other component of system 10, may determine a current torque being applied to rotor 12 based on the currently programmed gain value and the raw strain data generated by ADC module 78. In some examples, control module 66 may transmit the raw strain data, or other data derived from the raw strain data, and the associated gain value to processing module 22 and/or computing device 24 so that processing module 22 and/or computing device 24 may determine a current torque value using lookup table(s) and/or equation (s).

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claim.

What is claimed is:

1. A wireless torque measurement system comprising:
a rotor;
a rotor antenna attached to the rotor;
rotor electronics attached to the rotor, the rotor electronics configured to generate signals that indicate an amount of strain in the rotor and transmit, via the rotor antenna, digital data representative thereof;
a signal processing module configured to generate signals that provide power and data to the rotor electronics module and process the digital data transmitted by the rotor electronics; and
a single ear stator antenna coupled to the signal processing module and configured to be inductively coupled to the rotor antenna,
wherein the rotor electronics comprise:
a strain detection device attached to the rotor and configured to generate signals that indicate an amount of strain in the rotor;

a programmable gain amplifier attached to the rotor and configured to amplify the signals generated by the strain detection device by a programmable gain value;

an analog-to-digital converter module attached to the rotor and configured to receive the amplified signals and digitize the amplified signals to generate digital data and a control module attached to the rotor and configured to (i) supply the programmable gain value and (ii) transmit, via the rotor antenna, the digital data.

2. The system of claim 1, wherein the single ear stator antenna comprises a printed circuit board having a plurality of an arc-shaped traces formed thereon to form a helical coil.

3. The system of claim 1, wherein the rotor is configured to connect to a driving shaft that rotates the rotor, and wherein the rotor antenna, the strain detection device, the programmable gain amplifier, and the control module are configured to rotate along with the rotor.

4. The system of claim 1, wherein the rotor is configured to couple a driving shaft to an output shaft, wherein the rotor is configured to transfer a torque applied by the driving shaft to the output shaft, and wherein the amount of strain in the rotor is induced when the torque is applied by the driving shaft.

5. The system of claim 1, wherein the strain detection device comprises one or more strain gauges that are configured to generate the signals that indicate the amount of strain in the rotor.

6. The system of claim 1, wherein the control module is configured to automatically update the gain value based on the amplitude of the amplified signals generated by the programmable gain amplifier.

7. The system of claim 6, wherein the control module is configured to:
determine whether the amplitude of the amplified signals are greater than or equal to a threshold value; and
decrease the gain value in response to a determination that the amplified signals are greater than or equal to the threshold value.

8. The system of claim 7, wherein the threshold value is approximately equal to an output voltage saturation value of the programmable gain amplifier.

9. The system of claim 1, wherein the control module is configured to receive the gain value from the signal processing module.

10. The system of claim 1, wherein the control module is configured to determine the gain value based on data received from the signal processing module.

11. The system of claim 1, wherein at least one of the signal processing module and the control module is configured to determine an amount of torque being experienced by the rotor based on the amplitude of the amplified signals.

12. The system of claim 1, wherein at least one of the signal processing module and the control module are configured to determine the gain value based on an expected torque value received from a user.

13. A wireless torque measurement system comprising:
a rotor;
a rotor antenna attached to the rotor;
a strain detection device attached to the rotor and configured to generate signals that indicate an amount of strain in the rotor;
a programmable gain amplifier attached to the rotor and configured to amplify the signals generated by the strain detection device by a programmable gain value;
a control module attached to the rotor and configured to (i) supply the programmable gain value and (ii) transmit, via the rotor antenna, digital data that is derived from amplified signals;
a signal processing module configured to generate signals that provide power and data to the rotor electronics module and process the digital data transmitted by the rotor electronics; and
a single ear stator antenna coupled to the signal processing module and configured to be inductively coupled to the rotor antenna, the single ear antenna comprising a printed circuit board having a plurality of an arc-shaped traces formed thereon to form a helical coil,
wherein at least one of the control module and the processing module is configured to automatically update the gain value based on the amplitude of the amplified signals generated by the programmable gain amplifier.

14. The system of claim 13, wherein the control module is configured to receive the gain value from the signal processing module via the rotor antenna.

15. The system of claim 13, wherein the control module is configured to determine the gain value based on data received from the signal processing module.

16. A wireless torque measurement system comprising:
a rotor;
a rotor antenna attached to the rotor;
rotor electronics attached to the rotor, the rotor electronics configured to generate signals that indicate an amount of strain in the rotor and transmit, via the rotor antenna, digital data representative thereof;
a signal processing module configured to generate signals that provide power and data to the rotor electronics module and process the digital data transmitted by the rotor electronics; and
a single ear stator antenna coupled to the signal processing module and configured to be inductively coupled to the rotor antenna,
wherein the rotor electronics comprise:
a strain detection device attached to the rotor and configured to generate signals that indicate an amount of strain in the rotor;
a programmable gain amplifier attached to the rotor and configured to amplify the signals generated by the strain detection device by a programmable gain value; and
a control module attached to the rotor and configured to:
(i) determine whether the amplitude of the amplified signals are greater than or equal to a threshold value,
(ii) decrease the programmable gain value in response to a determination that the amplified signals are greater than or equal to the threshold value,
(iii) supply the programmable gain value, and
(iv) transmit, via the rotor antenna, the digital data.

* * * * *